United States Patent
Chikugo et al.

(10) Patent No.: US 9,356,280 B2
(45) Date of Patent: May 31, 2016

(54) LITHIUM ION SECONDARY BATTERY ELECTRODE, METHOD OF MANUFACTURING THE SAME, AND LITHIUM ION SECONDARY BATTERY

(71) Applicant: NEC ENERGY DEVICES, LTD., Sagamihara-shi, Kanagawa (JP)

(72) Inventors: Yuka Chikugo, Kanagawa (JP); Hitoshi Ishikawa, Kanagawa (JP); Yasutaka Kono, Kanagawa (JP); Ippei Waki, Kanagawa (JP); Koh Ishiguchi, Kanagawa (JP)

(73) Assignee: NEC ENERGY DEVICES, LTD., Kanagawa (JP)

( * ) Notice: Subject to any disclaimer, the term of this patent is extended or adjusted under 35 U.S.C. 154(b) by 42 days.

(21) Appl. No.: 14/352,942

(22) PCT Filed: Nov. 8, 2012

(86) PCT No.: PCT/JP2012/007155
§ 371 (c)(1),
(2) Date: Apr. 18, 2014

(87) PCT Pub. No.: WO2013/069280
PCT Pub. Date: May 16, 2013

(65) Prior Publication Data
US 2014/0248534 A1  Sep. 4, 2014

(30) Foreign Application Priority Data

Nov. 9, 2011  (JP) ................................. 2011-245175

(51) Int. Cl.
*H01M 4/04* (2006.01)
*H01M 4/13* (2010.01)
*H01M 4/139* (2010.01)
*H01M 4/62* (2006.01)
*H01M 10/0525* (2010.01)

(52) U.S. Cl.
CPC .............. *H01M 4/0404* (2013.01); *H01M 4/13* (2013.01); *H01M 4/139* (2013.01); *H01M 4/622* (2013.01); *H01M 10/0525* (2013.01); *Y02E 60/122* (2013.01); *Y02P 70/54* (2015.11); *Y02T 10/7011* (2013.01)

(58) Field of Classification Search
None
See application file for complete search history.

(56) References Cited

U.S. PATENT DOCUMENTS

| | | | |
|---|---|---|---|
| 2009/0317718 A1* | 12/2009 | Imachi | H01M 4/13 429/212 |
| 2013/0119318 A1* | 5/2013 | Hanasaki | H01M 4/622 252/500 |
| 2013/0119381 A1† | 5/2013 | Inoue | |

FOREIGN PATENT DOCUMENTS

| | | | |
|---|---|---|---|
| CN | 102934269 A | | 2/2013 |
| JP | 10-279608 A | | 10/1998 |
| JP | 11-149929 A | | 6/1999 |
| JP | H11-297313 A | † | 10/1999 |
| JP | 2000-299109 A | | 10/2000 |
| JP | 2002-231251 A | | 8/2002 |
| JP | 2008-287932 A | | 11/2008 |
| JP | 2008-546135 A | | 12/2008 |
| JP | 2011-134618 A | | 7/2011 |
| JP | 2011-243464 A | | 12/2011 |
| WO | WO 2011145419 A1 * | 11/2011 | H01M 4/622 |

OTHER PUBLICATIONS

Communication dated Aug. 17, 2015 from the State Intellectual Property Office of the People's Republic of China in counterpart Application No. 201280051011.1.

* cited by examiner
† cited by third party

*Primary Examiner* — Gregg Cantelmo
(74) *Attorney, Agent, or Firm* — Sughrue Mion, PLLC

(57) ABSTRACT

A lithium ion secondary battery electrode according to the present invention includes (A) a non-fluorinated polymer; (B) an active material; (C) a thickener; and (D) a conductive auxiliary agent. An elution ratio of (A) the non-fluorinated polymer in an electrolytic solution solvent at 60° C. is equal to or less than 1.0 mass %, and a swelling ratio of (A) the non-fluorinated polymer in the electrolytic solution solvent at 60° C. is equal to or more than 10 mass % and equal to or less than 50 mass %.

12 Claims, No Drawings

LITHIUM ION SECONDARY BATTERY ELECTRODE, METHOD OF MANUFACTURING THE SAME, AND LITHIUM ION SECONDARY BATTERY

CROSS REFERENCE TO RELATED APPLICATION

This application is a National Stage of International Application No. PCT/JP2012/007155, filed Nov. 8, 2012, claiming priority from Japanese Patent Application No. 2011-245175, filed Nov. 9, 2011, the contents of which are incorporated herein by reference in their entirety.

TECHNICAL FIELD

The present invention relates to a lithium ion secondary battery electrode, a method of manufacturing the same, and a lithium ion secondary battery.

BACKGROUND ART

In recent years, lithium ion secondary batteries have been used as batteries for small devices such as notebook PCs, mobile phones, electric tools, or electronic/communication devices. In addition, recently, lithium ion secondary batteries have begun to be used as batteries for large devices such as electric vehicles or hybrid vehicles.

A lithium ion secondary battery is mainly composed of: a positive electrode that has a metal oxide such as a lithium cobalt composite oxide as an active material; a negative electrode that has a carbon material such as graphite as an active material; and an electrolytic solution in which a lithium salt is dissolved. This battery is charged or discharged by lithium ions moving between the positive electrode and the negative electrode.

The positive electrode is obtained by coating a slurry containing the metal oxide and a binder on a surface of a positive electrode current collector such as an aluminum foil and drying the slurry. The negative electrode is obtained by coating a slurry containing the carbon material and a binder on a surface of a negative electrode current collector such as a copper foil and drying the slurry. Each of the binders used at this time has a function of binding active material particles to each other and binding the active material and the current collector to each other to prevent the active material from being separated from the current collector.

Currently, polyvinylidene fluoride (PVDF) has been used as a binder. However, in the case of PVDF, binding strengths between active material particles and between an active material and a current collector are weak. Therefore, in order to obtain a sufficient binding strength, it is necessary that an electrode contain a large amount of PVDF. As the content of PVDF is increased, the amount of an active material contained in a battery is decreased. Therefore, the capacity and the energy density of the obtained lithium ion secondary battery are decreased. In addition, during the preparation of an electrode, since PVDF is dissolved in N-methylol pyrrolidone (NMP) to be used, expensive NMP is used in a large amount. Therefore, since PVDF is used as a binder, the manufacturing cost of a lithium ion secondary battery is increased. Further since an organic solvent is used, the work environment during the preparation of an electrode deteriorates.

As a method to solve these problems, a styrene-butadiene rubber (SBR)-based aqueous dispersion is disclosed in which carboxymethyl cellulose (CMC) is used as a thickener in combination with a binder (for example, refer to Patent Document 1). This SBR-based dispersion is inexpensive because an expensive organic solvent is not used. In addition, since the SBR-based dispersion is aqueous, there is an advantageous effect from the viewpoint of the work environment. Further, since SBR is superior in binding properties between active material particles and between an active material and a current collector, the content of a binder in an electrode can be decreased.

For the above-described reasons, SBR has been widely used as a binder for a lithium ion secondary battery electrode.

However, this SBR is poor in electrolytic solution resistance. In addition, when the SBR is in contact with an electrolytic solution in a battery for a long time, binding strengths between active material particles and between an active material and a current collector are decreased, and distances between the active material particles, between conductive auxiliary agent particles, and between the active material and the current collector are increased, respectively. As a result, the electron conductivity of an electrode is decreased, and the internal resistance of the battery is increased. As the temperature of the battery is increased, such a decrease in binding strength is likely to occur. Therefore, when a lithium ion secondary battery using SBR is used particularly at a high temperature, the internal resistance of the battery is increased, and charge-discharge characteristics are decreased.

Patent Document 2 discloses (A) a binder containing polymer particles obtained by polymerizing: (a) 20 to 79 parts by weight of a (meth)acrylic acid ester monomer; (b) 20 to 60 parts by weight of a vinyl monomer; and (c) 0.01 to 30 parts by weight of an unsaturated carboxylic acid monomer, based on 100 parts by weight of a binder polymer.

In addition, Patent Document 3 discloses a binder composition for a nonaqueous secondary battery, the binder composition including: functional group-containing resin fine particles (A); and a cross-linking agent (B), in which the functional group-containing resin fine particles (A) are obtained by emulsion polymerization of ethylenically unsaturated monomers, which contains a keto group-containing ethylenically unsaturated monomer, in water with a radical polymerization initiator in the presence of a surfactant, and the cross-linking agent (B) is a polyfunctional hydrazide compound.

Since the binders disclosed in Patent Documents 2 and 3 are superior in electrolytic solution resistance, charge-discharge characteristics at a high temperature are superior.

RELATED DOCUMENT

Patent Document

[Patent Document 1] Japanese Unexamined Patent Publication No. 11-149929
[Patent Document 2] PCT Japanese Translation Patent Publication No. 2008-546135
[Patent Document 3] Japanese Unexamined Patent Publication No. 2011-134618

DISCLOSURE OF THE INVENTION

However, when the binders disclosed in Patent Documents 2 and 3 are used, charge-discharge characteristics at a low temperature deteriorate.

As described above, a lithium ion secondary battery using the binders disclosed in Patent Documents 2 and 3 is superior in charge-discharge characteristics at a high temperature but does not satisfy charge-discharge characteristics at a low temperature.

The present invention has been made in consideration of the above-described problems, and an object thereof is to provide a lithium ion secondary battery electrode capable of obtaining a lithium ion secondary battery having superior charge-discharge characteristics in a wide temperature range.

The present inventors have thoroughly investigated charge-discharge characteristics at a low temperature while changing the composition of a polymer. As a result, it was found that charge-discharge characteristics at a low temperature can be improved by changing the polymer composition to improve a penetration property of an electrolytic solution to a binder. However, although charge-discharge characteristics at a low temperature are improved, charge-discharge characteristics at a high temperature deteriorate.

That is, the present inventors found that, in a lithium ion secondary battery of the related art, a trade-off relationship is established between charge-discharge characteristics at a high temperature and charge-discharge characteristics at a low temperature, and this trade-off relationship cannot be improved by changing the polymer composition.

Accordingly, as a result of additional thorough investigation, the present inventors found that, when an electrode in which a swelling ratio and an elution ratio of a binder in an electrolytic solution solvent satisfy specific ranges is used, the trade-off relationship can be improved, and a lithium ion secondary battery having superior charge-discharge characteristics in a wide temperature range can be obtained, thereby completing the present invention.

That is, according to the present invention, there is provided a lithium ion secondary battery electrode including: a non-fluorinated polymer; an active material; a thickener; and a conductive auxiliary agent, in which an elution ratio of the non-fluorinated polymer in an electrolytic solution solvent at 60° C. is equal to or less than 1.0 mass %, and a swelling ratio of the non-fluorinated polymer in the electrolytic solution solvent at 60° C. is equal to or more than 10 mass % and equal to or less than 50 mass %.

Further, according to the present invention, there is provided a method of manufacturing the lithium ion secondary battery electrode according to the present invention, the method comprising:

a step of mixing the non-fluorinated polymer, the active material, the thickener, and the conductive auxiliary agent with each other to prepare a slurry;

a step of adjusting a pH of the slurry to a range equal to or higher than 3.0 and equal to or lower than 7.0; and a step of coating the slurry on a current collector and drying the slurry to form the active material layer on the current collector.

Further, according to the present invention, there is provided a lithium ion secondary battery which is manufactured using the lithium ion secondary battery electrode according to the present invention.

According to the present invention, a lithium ion secondary battery electrode capable of obtaining a lithium ion secondary battery having superior charge-discharge characteristics in a wide temperature range can be obtained.

DESCRIPTION OF EMBODIMENTS

Hereinafter, embodiments of the present invention will be described.

In these embodiments, a layer containing (A) a non-fluorinated polymer, (B) an active material, (C) a thickener, and (D) a conductive auxiliary agent is called an active material layer, and a product obtained by forming the active material layer on a current collector is called an electrode.

(Lithium Ion Secondary Battery Electrode)

First, a configuration of a lithium ion secondary battery electrode according to an embodiment of the present invention will be described.

The lithium ion secondary battery electrode according to the embodiment includes (A) a non-fluorinated polymer, (B) an active material, (C) a thickener, and (D) a conductive auxiliary agent.

In the lithium ion secondary battery electrode according to the embodiment, an elution ratio of (A) the non-fluorinated polymer in an electrolytic solution solvent at 60° C. is equal to or less than 1.0 mass %, preferably equal to or less than 0.9 mass %, and more preferably equal to or less than 0.8 mass %. When the elution ratio of (A) the non-fluorinated polymer in the electrolytic solution solvent at 60° C. is equal to or less than the upper limit, even if the electrode is in contact with an electrolytic solution at a high temperature for a long time, binding strengths between active material particles and between the active material and the current collector are maintained at a high level. Therefore, the obtained lithium ion secondary battery has sufficient charge-discharge characteristics even at a high temperature. Typically, the elution ratio of (A) the non-fluorinated polymer is equal to or less than 0.1 mass %.

In the lithium ion secondary battery electrode according to the embodiment, a swelling ratio of (A) the non-fluorinated polymer in the electrolytic solution solvent at 60° C. is equal to or more than 10 mass % and equal to or less than 50 mass %, preferably equal to or more than 12 mass % and equal to or less than 40 mass %, and still more preferably equal to or more than 14 mass % and equal to or less than 35 mass %. When the swelling ratio of (A) the non-fluorinated polymer to the electrolytic solution solvent at 60° C. is equal to or more than the lower limit, the amount of the electrolytic solution contained in a binder can be sufficiently secured even at a low temperature, and the obtained lithium ion secondary battery has sufficient charge-discharge characteristics even at a low temperature. In addition, when the swelling ratio of (A) the non-fluorinated polymer to the electrolytic solution solvent at 60° C. is equal to or less than the upper limit, even if the electrode is in contact with an electrolytic solution at a high temperature for a long time, binding strengths between the active material particles and between the active material and the current collector are maintained at a high level. Therefore, the obtained lithium ion secondary battery has sufficient charge-discharge characteristics even at a high temperature.

In the embodiment, the electrolytic solution solvent used to measure the swelling ratio and the elution ratio is obtained by mixing propylene carbonate and diethyl carbonate at a mass ratio of 1:1.

In the lithium ion secondary battery electrode according to the embodiment, when the total amount of the active material layer is 100 parts by mass, the content of (A) the non-fluorinated polymer is preferably equal to or more than 0.5 parts by mass and equal to or less than 3.0 parts by mass and particularly preferably equal to or more than 1.0 parts by mass and equal to or less than 2.5 parts by mass. In addition, the content of (B) the active material is preferably equal to or more than 93 parts by mass and equal to or less than 98.9 parts by mass and particularly preferably equal to or more than 95.1 parts by mass and equal to or less than 97.9 parts by mass. In addition, the content of (C) the thickener is preferably equal to or more than 0.5 parts by mass and equal to or less than 2.0 parts by mass and particularly preferably equal to or more than 0.8 parts by mass and equal to or less than 1.7 parts by mass. In addition, the content of (D) the conductive auxiliary agent is preferably equal to or more than 0.1 parts by mass and equal to or less than 2.0 parts by mass and particularly preferably equal to or more than 0.3 parts by mass and equal to or less than 1.2 parts by mass.

When the composition of the electrode is in the above-described range, balance between the yield of the electrode and the battery characteristics of the obtained lithium ion secondary battery is particularly superior.

Next, each component constituting the lithium ion secondary battery electrode according to the embodiment will be described.

(Non-Fluorinated Polymer)

(A) The non-fluorinated polymer contained in the lithium ion secondary battery electrode according to the embodiment is a binder having a function of binding the active material particles to each other and binding the active material and the current collector to each other.

The non-fluorinated polymer according to the embodiment is not particularly limited as long as it is a non-fluorinated polymer, but a polymer obtained by polymerizing an ethylenically unsaturated monomer mixture containing (a) a carboxyl group-containing unsaturated monomer, (b) an unsaturated carboxylic acid ester monomer, (c) an unsaturated monomer other than the (a) and the (b), and (d) an internal cross-linking agent is preferable.

Examples of (a) the carboxyl group-containing unsaturated monomer used in the embodiment include ethylenically unsaturated monocarboxylic acid monomers such as acrylic acid, methacrylic acid, or crotonic acid; unsaturated dicarboxylic acid monomers such as maleic acid, fumaric acid, citraconic acid, mesaconic acid, glutaconic acid, itaconic acid, crotonic acid, or isocrotonic acid, and anhydrides thereof; β-carboxyethyl acrylate; and monoesters of 2-hydroxyethyl acrylate and dicarboxylic acid derivatives.

Among these, acrylic acid, methacrylic acid, itaconic acid, β-carboxyethyl acrylate, and monoesters of 2-hydroxyethyl acrylate and dicarboxylic acid derivatives are preferable, and acrylic acid, methacrylic acid, and itaconic acid are particularly preferable. These carboxyl group-containing unsaturated monomers may be used alone or in a combination of two or more kinds.

When the total amount of the ethylenically unsaturated monomer mixture is 100 mass %, the used amount of (a) the carboxyl group-containing unsaturated monomer is preferably equal to or more than 0.1 mass % and equal to or less than 10 mass % and more preferably equal to or more than 1 mass % and equal to or less than 5 mass %. When the used amount of the carboxyl group-containing monomer is in the above-described range, balance between the mechanical stability, the heat resistance, and the binding property of the obtained electrode is further improved.

Examples of (b) the unsaturated carboxylic acid ester monomer used in the embodiment include acrylic acid esters such as methyl acrylate, ethyl acrylate, n-propyl acrylate, isopropyl acrylate, n-butyl acrylate, tert-butyl acrylate, isobutyl acrylate, n-amyl acrylate, isoamyl acrylate, n-hexyl acrylate, 2-ethylhexyl acrylate, lauryl acrylate, n-octyl acrylate, isooctyl acrylate, n-nonyl acrylate, stearyl acrylate, cyclohexyl acrylate, isononyl acrylate, isobornyl acrylate, benzyl acrylate, 2-hydroxyethyl acrylate, 2-hydroxypropyl acrylate, or glycidyl acrylate; methacrylic acid esters such as methyl methacrylate, ethyl methacrylate, n-propyl methacrylate, isopropyl methacrylate, n-butyl methacrylate, tert-butyl methacrylate, isobutyl methacrylate, n-amyl methacrylate, isoamyl methacrylate, n-hexyl methacrylate, 2-ethylhexyl methacrylate, lauryl methacrylate, n-octyl methacrylate, isooctyl methacrylate, n-nonyl methacrylate, stearyl methacrylate, cyclohexyl methacrylate, isononyl methacrylate, isobornyl methacrylate, benzyl methacrylate, 2-hydroxyethyl methacrylate, 2-hydroxypropyl methacrylate, or glycidyl methacrylate; amino group-containing methacrylic acid esters such as dimethylaminoethyl methacrylate or diethylaminoethyl methacrylate; alkoxy group-containing methacrylic acid esters such as methoxy polyethylene glycol monomethacrylate; and crotonic acid esters such as methyl crotonate, ethyl crotonate, n-propyl crotonate, butyl crotonate, tert-butyl crotonate, isobutyl crotonate, n-amyl crotonate, isoamyl crotonate, n-hexyl crotonate, 2-ethylhexyl crotonate, lauryl crotonate, n-octyl crotonate, isooctyl crotonate, n-nonyl crotonate, stearyl crotonate, cyclohexyl crotonate, isononyl crotonate, isobornyl crotonate, benzyl crotonate, 2-hydroxyethyl crotonate, 2-hydroxypropyl crotonate, or glycidyl crotonate.

Among the unsaturated carboxylic acid ester monomers, (meth)acrylic acid esters in which the number of carbon atoms in an alkyl portion is 1 to 12 and preferably 2 to 8 are particularly preferable, for example, 2-hydroxyethyl acrylate, 2-hydroxypropyl acrylate, 2-hydroxyethyl methacrylate, and 2-hydroxypropyl methacrylate. In addition, for example, (meth)acrylic acid esters containing a phosphoric acid residue, a sulfonic acid residue, or a boric acid residue in the alkyl group may be used.

When the total amount of the ethylenically unsaturated monomer mixture is 100 mass %, the used amount of (b) the unsaturated carboxylic acid ester monomer is preferably equal to or more than 20 mass % and equal to or less than 84.8 mass % and more preferably equal to or more than 40 mass % and equal to or less than 75 mass %. When the used amount of the unsaturated carboxylic acid ester monomer is in the above-described range, balance between the flexibility, the heat resistance, and the binding property of the obtained electrode is further improved.

Examples of (c) the unsaturated monomer other than (a) the carboxyl group-containing unsaturated monomer and (b) the unsaturated carboxylic acid ester monomer which is used in the embodiment include styrene, α-methylstyrene, β-methylstyrene, p-t-butylstyrene, acrylonitrile, methacrylonitrile, vinyl acetate, vinyl propionate, N-methylol methacrylamide, acrylamide, N-methylol acrylamide, methacrylamide, and mixtures thereof. Among these, styrene is particularly preferable. When styrene is used, particularly, if a carbon material such as graphite is used as the active material, the binding property is further superior.

When the total amount of the ethylenically unsaturated monomer mixture is 100 mass %, the used amount of (c) the unsaturated monomer other than (a) the carboxyl group-containing unsaturated monomer and (b) the unsaturated carboxylic acid ester monomer is preferably equal to or more than 15 mass % and equal to or less than 70 mass % and more preferably equal to or more than 30 mass % and equal to or less than 60 mass %. When the used amount of (c) the unsaturated monomer is in the above-described range, balance between the flexibility and the binding property of the obtained electrode is further improved.

(d) The internal cross-linking agent used in the embodiment is not particularly limited as long as it has at least one ethylenically unsaturated bond and a functional group which is reactive with another functional group or has two or more ethylenically unsaturated bonds. Examples of the internal cross-linking agent include polyfunctional monomers having two or more unsaturated groups such as divinylbenzene, ethylene glycol diacrylate, ethylene glycol dimethacrylate, trimethylolpropane triacrylate, trimethylolpropane trimethacrylate, or triallyl cyanurate; and silane coupling agents such as vinyltrimethoxysilane, γ-methacryloxypropyltrimethoxysilane, vinyltriethoxysilane, or γ-methacryloxypropyltriethoxysilane. Among these, divinylbenzene is preferable. These internal cross-linking agents may be used alone or in a combination of two or more kinds.

When the total amount of the ethylenically unsaturated monomer mixture is 100 mass %, the used amount of (d) the internal cross-linking agent is preferably equal to or more than 0.05 mass % and equal to or less than 10 mass % and more preferably equal to or more than 0.08 mass % and equal to or less than 1 mass %. When the used amount of (d) the internal cross-linking agent is in the above-described range, balance between the elution ratio and the binding property of the binder is further improved.

The glass transition temperature (Tg) of the non-fluorinated polymer contained in the lithium ion secondary battery electrode according to the embodiment is preferably equal to or higher than −10° C. and equal to or lower than 30° C. and more preferably equal to or higher than −8° C. and equal to or lower than 15° C. When the glass transition temperature is in the above-described range, balance between the swelling and elution of the binder to the electrolytic solution and the flexibility of the electrode is further improved. The glass transition temperature of the non-fluorinated polymer is a value measured by differential scanning calorimetry (DSC).

The glass transition temperature can be measured as follows. The non-fluorinated polymer is weighed on an aluminum pan, this aluminum pan is set on a DSC holder, and an endothermic peak in a chart obtained under a temperature increase condition of 10° C./min is read. The peak temperature at this time is set to the glass transition temperature.

A polymerization method of the non-fluorinated polymer according to the embodiment is not particularly limited, but it is preferable that the non-fluorinated polymer be obtained by emulsion polymerization. When emulsion polymerization is used, latex particles containing the non-fluorinated polymer can be obtained.

The average particle size of the latex particles containing the non-fluorinated polymer is not particularly limited, but is preferably equal to or more than 10 nm and equal to or less than 500 nm and more preferably equal to or more than 30 nm and equal to or less than 250 nm. When the average particle size is in the above-described range, balance between the swelling, the elution, and the binding property of the binder and the dispersibility of particles to the electrolytic solution is further improved.

The average particle size described in the embodiment refers to a volume average particle size and can be measured by dynamic light scattering.

The average particle size of the latex particles can be measured as follows by dynamic light scattering. A dispersion of the latex particles is diluted with water to be 200 times to 1000 times with respect to the solid content. About 5 ml of this diluted solution was poured into a cell of a measuring device (for example, a Microtrac particle size analyzer, manufactured by Nikkiso Co., Ltd.). Then, refractive index conditions of a solvent (in the embodiment, water) and a polymer corresponding to a sample were input for the measurement. At this time, a peak of the obtained volume particle size distribution data is set to the average particle size according to the embodiment.

Hereinafter, the emulsion polymerization of the non-fluorinated polymer according to the embodiment will be described.

As the emulsion polymerization, a well-known method of the related art is used. Examples of the well-known method include a polymerization method in which the ethylenically unsaturated monomer mixture is prepared in a batch process and a polymerization method in which the ethylenically unsaturated monomer mixture is continuously supplied. The polymerization is performed under stirring at a temperature of 30° C. to 90° C.

Examples of an aqueous medium used in the emulsion polymerization of the embodiment include water. In addition, a hydrophilic organic solvent can also be appropriately mixed.

A polymerization initiator used in the emulsion polymerization of the embodiment is not particularly limited as long as it has a capability to start radical polymerization, and a well-known oil-soluble polymerization initiator or a water-soluble polymerization initiator can be used. Examples of the oil-soluble polymerization initiator include organic peroxides such as benzoyl peroxide, tert-butyl peroxy benzoate, tert-butyl hydroperoxide, tert-butyl peroxy(2-ethylhexanoate), tert-butyl peroxy-3,5,5-trimethylhexanoate, or di-tert-butyl peroxide; and azobis compounds such as 2,2'-azobisisobutyronitrile, 2,2'-azobis-2,4-dimethylvaleronitrile, 2,2'-azobis(4-methoxy-2,4-dimethylvaleronitrile), or 1,1'-azobis-cyclohexane-1-carbonitrile.

Examples of the water-soluble polymerization initiator include ammonium persulfate, potassium persulfate, hydrogen persulfate, and 2,2'-azobis(2-methylpropionamidine)dihydrochloride. In the embodiment, it is preferable that the water-soluble polymerization initiator be used.

These polymerization initiators may be used alone or in a combination of two or more kinds. The used amount of the polymerization initiator is preferably equal to or more than 0.1 parts by mass and equal to or less than 10 parts by mass with respect to 100 parts by mass of the ethylenically unsaturated monomer mixture.

In addition, when the emulsion polymerization is performed, a reducing agent can be used in combination with the polymerization initiator. By using the reducing agent, a polymerization rate is increased, and the emulsion polymerization can be easily progressed at a low temperature. Examples of the reducing agent include metal salts such as ascorbic acid, erythorobic acid, tartaric acid, citric acid, glucose, or formaldehyde sulfoxylate; and sodium thiosulfate, sodium sulfate, sodium bisulfite, sodium pyrosulfite, ferrous chloride, Rongalite, or thioureadioxide.

The used amount of the reducing agent is preferably equal to or more than 0.05 parts by mass and equal to or less than 5 parts by mass with respect to 100 parts by mass of the ethylenically unsaturated monomer mixture. The polymerization can be performed by irradiation of ultraviolet rays or radiation. A polymerization temperature is preferably equal to or higher than a polymerization start temperature of the polymerization initiator. For example, the polymerization temperature of a peroxide-based polymerization initiator is typically 70° C. The polymerization time is not particularly limited, but is preferably equal to or longer than 1 hour and equal to or shorter than 24 hours.

In addition, as a buffer, sodium acetate, sodium citrate, or sodium bicarbonate may be used.

Further, as a chain transfer agent, mercaptans such as octyl mercaptan, 2-ethylhexyl thioglycolate, octyl thioglycolate, stearyl mercaptan, lauryl mercaptan, or t-dodecyl mercaptan may be used.

In the embodiment, it is preferable that a basic material be added during or after the polymerization to adjust pH. By adjusting pH, the polymerization stability, the mechanical stability, and the chemical stability during the emulsion polymerization can be improved.

Examples of the basic material used at this time include ammonia, trimethylamine, triethylamine, butylamine, ethanolamine, 2-dimethylaminoethanol, diethanolamine, triethanolamine, aminomethyl propanol, and sodium hydroxide. These basic materials may be used alone or in a combination of two or more kinds.

As an emulsifier used in the emulsion polymerization of the embodiment, a surfactant such as an anionic surfactant or a nonionic surfactant can be used.

Examples of the anionic surfactant include higher fatty acid salts such as sodium oleate; alkylarylsulfonic acid salts such as sodium dodecylbenzenesulfonate; polyoxyethylene distyrenated phenyl ether sulfuric acid ester salts; alkylsulfuric acid ester salts such as sodium lauryl sulfate; polyoxyethylene alkyl aryl ether sulfuric acid ester salts such as sodium polyoxyethylene nonylphenyl ether sulfate; alkyl sulfosuccinic acid ester salts such as sodium monooctyl sulfosuccinate, sodium dioctyl sulfosuccinate, or sodium polyoxyethylene lauryl sulfosuccinate, and derivatives thereof; polyoxyethylene alkyl ether sulfuric acid ester salts such as sodium polyoxyethylene lauryl ether sulfate; and anionic reactive surfactants having a double bond.

Examples of the nonionic surfactant include polyoxyethylene alkyl ethers such as polyoxyethylene lauryl ether or polyoxyethylene stearyl ether; polyoxyethylene alkyl phenyl ethers such as polyoxyethylene octyl phenyl ether or polyoxyethylene nonyl phenyl ether; sorbitan higher fatty acid esters such as sorbitan monolaurate, sorbitan monostearate, or sorbitan trioleate; glycerin higher fatty acid esters such as oleic acid monoglyceride or stearic acid monoglyceride; polyoxyethylene-polyoxypropylene block copolymers; polyoxyethylene distyrenated phenyl ether; polyoxyethylene sorbitan higher fatty acid esters such as polyoxyethylene sorbitan monolaurate; polyoxyethylene higher fatty acid esters such as polyoxyethylene monolaurate, or polyoxyethylene monostearate; and nonionic reactive surfactants having a double bond.

The above-described examples of the emulsifier may be used alone or in a combination of two or more kinds. The used amount of the emulsifier is preferably equal to or more than 0.1 parts by mass and equal to or less than 30 parts by mass, more preferably equal to or more than 0.3 parts by mass and equal to or less than 20 parts by mass, and still more preferably equal to or more than 0.5 parts by mass and equal to or less than 10 parts by mass with respect to 100 parts by mass of the ethylenically unsaturated monomer mixture. When the used amount of the emulsifier is in the above-described range, balance between the stability of the latex particles and the binding property of the binder is further improved.

In the lithium ion secondary battery electrode according to the embodiment, it is preferable that a part of the latex particles containing the non-fluorinated polymer be attached on a surface of the electrode. When a part of the latex particles is attached on the surface of the electrode, the adhesion with a separator described below is improved, and the internal resistance of the battery is decreased. Therefore, the battery characteristics of the obtained lithium ion secondary battery are improved.

(Active Material)

The active material contained in the lithium ion secondary battery electrode according to the embodiment is appropriately selected according to the use. When a positive electrode is prepared, a positive electrode active material is used. When a negative electrode is prepared, a negative electrode active material is used.

As the positive electrode active material, a material having high electron conductivity is preferable such that lithium ions can be reversibly released or stored and electrons can be easily transported. Examples of such material include composite oxides such as a lithium nickel composite oxide, a lithium cobalt composite oxide, a lithium manganese composite oxide, or a lithium-manganese-nickel composite oxide; transition metal sulfides such as $TiS_2$, FeS, or $MoS_2$; transition metal oxides such as MnO, $V_2O_5$, $V_6O_{13}$, or $TiO_2$; and olivine type lithium phosphorus oxides.

For example, these olivine type lithium phosphorus oxides contain at least one element selected from the group consisting of Mn, Cr, Co, Cu, Ni, V, Mo, Ti, Zn, Al, Ga, Mg, B, Nb, and Fe; lithium; phosphorus; and oxygen. In these compounds, in order to improve characteristics thereof, a part of elements may be substituted with another element.

Among these, an olivine type lithium iron phosphorus composite oxide, a lithium cobalt composite oxide, a lithium nickel composite oxide, a lithium manganese composite oxide, or a lithium-manganese-nickel composite oxide is preferable. These positive electrode active materials have a high action potential, a high capacity, and a high energy density.

The negative electrode active material is not particularly limited as long as it is a commonly-used negative electrode active material which can be used in a negative electrode of a lithium ion secondary battery. Examples of the negative electrode active material include carbon materials such as natural graphite, artificial graphite, resinous coal, carbon fiber, activated carbon, hard carbon, or soft carbon; lithium-based metals such as lithium metal or lithium alloys; metals such as silicon or tin; and conductive polymers such as polyacene, polyacetylene, or polypyrrole. Among these, carbon materials are preferable, and natural graphite and artificial graphite are particularly preferable.

The average particle size of the active material is not particularly limited, but is preferably equal to or more than 15 μm and equal to or less than 22 μm and more preferably equal to or more than 18.5 μm and equal to or less than 21 μm. When the average particle size is in the above-described range, balance between the binding property and the dispersibility of the active material is further improved. The average particle size of the active material is a particle size ($D_{50}$, average particle size) which is a cumulative value of 50% in a cumulative volume particle size distribution when measured using a laser diffraction particle size distribution analyzer.

The specific surface area of the active material which is obtained using a nitrogen adsorption BET method is not particularly limited, but is preferably equal to or more than 1 $m^2/g$ and equal to or less than 6 $m^2/g$ and more preferably equal to or more than 2 $m^2/g$ and equal to or less than 4 $m^2/g$. When the specific surface area is in the above-described range, balance between the yield and the binding property of the electrode is further improved.

(Thickener)

The thickener contained in the lithium ion secondary battery electrode according to the embodiment is not particularly limited as long as it improves the coating property of the slurry for the electrode described below. Examples of the thickener include water-soluble polymers including cellulose-based polymers such as carboxymethyl cellulose, methyl cellulose, or hydroxypropyl cellulose and ammonium salts and alkali metal salts thereof; polycarboxylic acids; polyethylene oxides; polyvinyl pyrrolidones; polyacrylic acid salts such as sodium polyacrylate; and polyvinyl alcohols.

The above-described examples of the thickener may be used alone or in a combination of two or more kinds. The used amount of the thickener is preferably equal to or more than 0.5 parts by mass and equal to or less than 2.0 parts by mass, more preferably equal to or more than 0.8 parts by mass and equal to or less than 1.7 parts by mass, and still more preferably equal to or more than 0.8 parts by mass and equal to or less than 1.5 parts by mass. When the used amount of the thickener is in the above-described range, balance between the coating property of the electrode slurry and the binding property of the binder is further improved.

(Conductive Auxiliary Agent)

The conductive auxiliary agent contained in the lithium ion secondary battery electrode according to the embodiment is not particularly limited as long as it has electron conductivity and improves the conductivity of the electrode. Examples of the conductive auxiliary agent of the embodiment include carbon materials such as acetylene black, ketjen black, and carbon black.

The above-described examples of the conductive auxiliary agent may be used alone or in a combination of two or more kinds. When the total amount of the active material layer is 100 parts by mass, the used amount of the conductive auxiliary agent is preferably equal to or more than 0.1 parts by mass and equal to or less than 2.0 parts by mass, more preferably equal to or more than 0.3 parts by mass and equal to or less than 1.2 parts by mass, and still more preferably equal to or more than 0.5 parts by mass and equal to or less than 1.2 parts by mass. When the used amount of the conductive auxiliary agent is in the above-described range, balance between the coating property of the electrode slurry and the binding property of the binder is further improved.

(Method of Manufacturing Lithium Ion Secondary Battery Electrode)

Next, a method of manufacturing a lithium ion secondary battery electrode according to the embodiment will be described.

It is preferable that the method of manufacturing the lithium ion secondary battery electrode according to the embodiment include three steps of the following (1) to (3).

(1) a step of mixing the non-fluorinated polymer, the active material, the thickener, and the conductive auxiliary agent with each other to prepare a slurry;

(2) a step of adjusting a pH of the slurry to a range equal to or higher than 3.0 and equal to or lower than 7.0; and (3) a step of coating the slurry on a current collector and drying the slurry to form the active material layer on the current collector.

Hereinafter, each step will be described.

(Step of Preparing Slurry)

First, the step of preparing a slurry according to the embodiment will be described. The electrode slurry according to the embodiment is obtained by dispersing (A) the non-fluorinated polymer, (B) the active material, (C) the thickener, and (D) the conductive auxiliary agent in water or in a mixture of water and a highly hydrophilic solvent.

The mixing order of the respective components is not particularly limited. However, in the embodiment, it is preferable that, after (C) the thickener and (D) the conductive auxiliary agent are mixed with each other to obtain a mixture, the mixture be further mixed with (A) the non-fluorinated polymer and (B) the active material to prepare the slurry.

As a result, the elution ratio of (A) the non-fluorinated polymer in the electrolytic solution solvent at 60° C. can be decreased. In addition, since the penetration property of the electrolytic solution solvent to the non-fluorinated polymer is improved, the swelling ratio of (A) the non-fluorinated polymer in the electrolytic solution solvent at 60° C. can be improved.

The reason why the elution ratio of (A) the non-fluorinated polymer is decreased and the swelling ratio thereof is improved is not necessarily clear but is presumed to be as follows. By mixing the respective components according to the above-described order, the dispersibility of (A) the non-fluorinated polymer in the slurry is improved. As a result, the state in which (A) the non-fluorinated polymer is dispersed in the obtained electrode is changed, and the affinity in the electrolytic solution solvent is changed.

At this time, as a mixer to be used, a well-known mixer such as a ball mill or a planetary mixer can be used but is not particularly limited.

In addition, when the latex particles are used as the non-fluorinated polymer, a ratio of the average particle size of the active material to the average particle size of the latex particles is preferably equal to or more than 50 and equal to or less than 200 and more preferably equal to or more than 75 and equal to or less than 170. When the ratio of the average particle size is in the above-described range, the elution ratio of (A) the non-fluorinated polymer in the electrolytic solution solvent at 60° C. can be decreased. In addition, since the penetration property of the electrolytic solution solvent to the non-fluorinated polymer is improved, the swelling ratio of (A) the non-fluorinated polymer in the electrolytic solution solvent at 60° C. can be improved.

The reason why the elution ratio of (A) the non-fluorinated polymer is decreased and the swelling ratio thereof is improved is not necessarily clear but is presumed to be as follows. By adjusting the ratio of the average particle size as described above, the dispersibility of (A) the non-fluorinated polymer in the slurry is improved. As a result, the state in which (A) the non-fluorinated polymer is dispersed in the obtained electrode is changed, and the affinity in the electrolytic solution solvent is changed.

(Step of Adjusting pH of Slurry)

Next, the pH of the obtained slurry is preferably adjusted to a range equal to or higher than 3.0 and equal to or lower than 7.0 and more preferably adjusted to a range equal to or higher than 4.0 and equal to or lower than 6.0. When the pH of the slurry is in the above-described range, the elution ratio of (A) the non-fluorinated polymer in the electrolytic solution solvent at 60° C. can be decreased. In addition, since the penetration property of the electrolytic solution solvent to the non-fluorinated polymer is improved, the swelling ratio of (A) the non-fluorinated polymer in the electrolytic solution solvent at 60° C. can be improved.

The reason why the elution ratio of (A) the non-fluorinated polymer is decreased and the swelling ratio thereof is improved is not necessarily clear but is presumed to be as follows. By adjusting the pH as described above, the dispersibility of (A) the non-fluorinated polymer in the slurry is improved. As a result, the state in which (A) the non-fluorinated polymer is dispersed in the obtained electrode is changed, and the affinity in the electrolytic solution solvent is changed.

A method of adjusting the pH of the slurry to a range equal to or higher than 3.0 and equal to or lower than 7.0 is not particularly limited, but it is preferable that the pH be adjusted by addition of an acid material or a basic material.

Examples of the acid material include inorganic acids such as hydrochloric acid, sulfuric acid, or hydrofluoric acid; and organic acids such as acetic acid, acrylic acid, methacrylic acid, glycolic acid, lactic acid, malic acid, tartaric acid, citric acid, oxalic acid, malonic acid, succinic acid, adipic acid, glutaric acid, maleic acid, fumaric acid, citraconic acid, aconitic acid, pimelic acid, suberic acid, azelaic acid, sebacic acid, dodecane dicarboxylic acid, 1,4-cyclohexanedicarboxylic acid, diacetyl tartaric acid, or trivalent or higher carboxylic acids.

Among these, organic acids are particularly preferable. When organic acids are used, the pH of the slurry can be efficiently adjusted to the above-described range. In addition, among the organic acids, polyvalent carboxylic acids such as oxalic acid, malonic acid, succinic acid, adipic acid, glutaric acid, maleic acid, fumaric acid, citraconic acid, aconitic acid, pimelic acid, suberic acid, azelaic acid, sebacic acid, dodecane dicarboxylic acid, 1,4-cyclohexanedicarboxylic acid, diacetyl tartaric acid, or trivalent or higher carboxylic acids are particularly preferable. As the polyvalent carboxylic acids, oxalic acid, malonic acid, or succinic acid is particularly preferable.

By adjusting the pH using the polyvalent carboxylic acids, the elution ratio of (A) the non-fluorinated polymer in the electrolytic solution solvent at 60° C. can be further decreased. In addition, since the penetration property of the electrolytic solution solvent to the non-fluorinated polymer is further improved, the swelling ratio of (A) the non-fluorinated polymer in the electrolytic solution solvent at 60° C. can be further improved.

Examples of the basic material include ammonia, trimethylamine, triethylamine, butylamine, ethanolamine, 2-dimethylaminoethanol, diethanolamine, triethanolamine, aminomethyl propanol, and sodium hydroxide.

(Step of Forming Active Material Layer)

Next, the obtained slurry is coated on a current collector and dried to form the active material layer on the current collector.

As a method of coating the slurry, a commonly-used method can be used. Examples of the coating method include a reverse roll method, a direct roll method, a doctor blade method, a knife method, an extrusion method, a curtain method, a gravure method, a bar method, a dip method, and a squeeze method. Among these, a doctor blade method, a knife method, or an extrusion method is preferable from the viewpoints of obtaining superior surface state of a coating layer according to the physical properties such as the viscosity of the slurry and a drying property.

The slurry may be coated on a single surface or both surfaces of the current collector. When the slurry is coated on both surfaces of the current collector, the slurry may be coated sequentially on each surface or simultaneously on both surfaces. In addition, the slurry may be continuously or intermittently coated on the surface of the current collector. The thickness, the length, and the width of the coating layer can be appropriately determined according to the size of the battery.

As a method of drying the coated slurry, a commonly-used method can be used. In particular, one or a combination of methods using hot wind, vacuum, infrared rays, far infrared rays, electron rays, and low-temperature wind is preferably used. A drying temperature is preferably in a range equal to or higher than 50° C. and equal to or lower than 350° C. and particularly preferably in a range equal to or higher than 50° C. and equal to or lower than 200° C.

(Current Collector)

The current collector used for manufacturing the electrode according to the embodiment is not particularly limited as long as it is formed of a metal such as iron, copper, aluminum, nickel, stainless steel, or titanium. From the viewpoints of price, availability, electrochemical stability, and the like, aluminum is preferable for the positive electrode, and copper is preferable for the negative electrode. In addition, the shape of the current collector is not particularly limited, but is preferably a sheet shape having a thickness in a range of 0.001 mm to 0.5 mm.

In addition, it is preferable that the current collector for the positive electrode be coated with a conductive thin film to prevent the corrosion due to the slurry. The conductive thin film is not particularly limited as long as it has corrosion resistance and is electrochemically stable, and examples thereof include a mixture obtained by mixing a polymer such as polyvinylidene fluoride with the above-described conductive auxiliary agent.

The lithium ion secondary battery electrode according to the embodiment can be optionally pressed. As a press method, a commonly-used method can be used, but a die press method or a calender press method is particularly preferable. A press pressure is not particularly limited, but is preferably in a range of 0.2 t/cm$^2$ to 3 t/cm$^2$.

(Lithium Ion Secondary Battery)

The lithium ion secondary battery electrode according to the embodiment can be manufactured with a well-known method using the positive electrode and/or the negative electrode and the electrolytic solution of the embodiment and optionally using a separator or the like. As the electrode, a laminate or a wound body can be used. As an outer casing, a metal outer casing or an aluminum laminate outer casing can be appropriately used. The shape of the battery may be any shape such as a coil shape, a button shape, a seat shape, a cylinder shape, a square shape, or a flat shape.

As an electrolyte in the electrolytic solution of the battery any well-known lithium salt can be used and may be selected according to the kind of the active material. Examples of the electrolyte include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $CF_3SO_3Li$, $CH_3SO_3Li$, $LiCF_3SO_3$, $LiC_4F_9SO_3$, $Li(CF_3SO_2)_2N$, and lower fatty acid lithium carboxylate.

A solvent for dissolving the electrolyte is not particularly limited as long as it is commonly used as a liquid for dissolving the electrolyte, and examples thereof include carbonates such as ethylene carbonate (EC), propylene carbonate (PC), butylene carbonate (BC), dimethyl carbonate (DMC), diethyl carbonate (DEC), methyl ethyl carbonate (MEC), or vinylene carbonate (VC); lactones such as γ-butyrolactone or γ-valerolactone; ethers such as trimethoxymethane, 1,2-dimethoxyethane, diethyl ether, 2-ethoxyethane, tetrahydrofuran, or 2-methyltetrahydrofuran; sulfoxides such as dimethyl sulfoxide; oxolanes such as 1,3-dioxolane or 4-methyl-1,3-dioxolane; nitrogen-containing compounds such as acetonitrile, nitromethane, formamide, or dimethyl formamide; organic acid esters such as methyl formate, methyl acetate, ethyl acetate, butyl acetate, methyl propionate, or ethyl propionate; phosphate triesters and diglymes; triglymes; sulfolanes such as sulfolane or methyl sulfolane; oxazolidinones such as 3-methyl-2-oxazolidinone; and sultones such as 1,3-propanesultone, 1,4-butanesultone, or naphtha sultone. These solvents may be used alone or in a combination of two or more kinds.

As the separator, a porous substrate is preferable. The form of the separator may be a membrane, a film, or a fiber.

As the separator, for example, a porous separator or a porous separator of which a single surface or both surfaces are coated with a gel polymer may be used. Examples of the porous separator include polyolefine-based separators such as polypropylene-based separators or polyethylene-based separators; and porous separators such as polyvinylidene fluoride, polyethylene oxide, polyacrylonitrile, or polyvinylidene fluoride-hexafluoropropylene copolymers.

The gel polymer is not particularly limited as long as it can be gelled during the impregnation of the electrolytic solution. Examples of the gel polymer include polyvinylidene fluoride, polyethylene oxide, polyacrylonitrile, and polyvinylidene fluoride-hexafluoropropylene copolymers. In addition, as a method of forming the gel polymer on the separator, a well-known method can be used. For example, the gel polymer is dissolved in the solvent, and the obtained solution is coated on the separator.

Hereinabove, the embodiments of the present invention have been described. However, these embodiments are merely examples of the present invention, and various configurations other than the above-described configurations can be adopted.

EXAMPLES

Hereinafter, Examples and Comparative Examples of the present invention will be described, but the present invention is not limited thereto. In the examples, part(s) represent part(s) by mass unless specified otherwise.

(Preparation of Non-Fluorinated Polymer A)

70 parts of ion exchange water, 0.2 parts of sodium dodecylbenzenesulfonate, and 0.3 parts of potassium persulfate were put into a reaction vessel equipped with a stirrer, a thermometer, a dripping funnel, and a reflux device. Next, the internal temperature was increased to 60° C., followed by sufficient nitrogen substitution in the reaction vessel.

In addition, 0.5 parts of sodium dodecylbenzenesulfonate, 50 parts of ion exchange water, 2 parts of acrylic acid, 42 parts of 2-ethylhexyl acylate, 1.7 parts of 2-hydroxyethyl methacrylate, 16.2 parts of n-butyl acrylate, 38 parts of styrene, and 0.1 parts of divinylbenzene were mixed to obtain a monomer mixture.

Next, this monomer mixture was continuously added to the reaction vessel for 6 hours, followed by polymerization. The addition was performed at 60° C. After completion of the addition, the monomer mixture was stirred at 70° C. for 3 hours. Next, the temperature was decreased to 30° C., and the polymerization was completed. Ammonia water was added to the obtained polymerization reaction solution to adjust the pH to 7. Steam was introduced to remove unreacted monomers. The solid content was adjusted to 45% with ion exchange water, and an aqueous dispersion containing a non-fluorinated polymer A was obtained. The solid content was calculated from the residue obtained by heating the aqueous dispersion at 150° C. for 20 minutes to remove water from the aqueous dispersion.

(Preparation of Non-Fluorinated Polymers B and C)

The polymerization was performed with the same method as that of the polymer A, except that the composition was changed as described in Table 1. As a result, an aqueous dispersion containing a non-fluorinated polymer B and an aqueous dispersion containing a non-fluorinated polymer C were obtained.

The average particle size of the latex particles containing the non-fluorinated polymer was measured by dynamic light scattering using a light scattering device.

(Each Component of Lithium Ion Secondary Battery Electrode)

Hereinafter, the following raw materials were used as components of the electrode.

Negative electrode A: (natural graphite, average particle size $d_{50}$: 20 μm)

Negative electrode B: (natural graphite, average particle size $d_{50}$: 10 μm)

Negative electrode C: (natural graphite, average particle size $d_{50}$: 43 μm)

Thickener A: (carboxymethyl cellulose, solid content concentration: 1 mass %, solvent: ion exchange water)

Conductive auxiliary agent A: (acetylene black)

Example 1

Preparation of Negative Electrode

After 1 part of the conductive auxiliary agent A and 1 part of the thickener A were kneaded to obtain a mixture, 96 parts of the negative electrode A and 2 parts of the non-fluorinated polymer A were added to the mixture, followed by kneading. As a result, a slurry was prepared. Next, oxalic acid was added to the obtained slurry to adjust the pH to 5.1.

This slurry was coated on both surfaces of a copper foil having a thickness of 10 μm such that the thickness after roll press was 120 μm, followed by drying at 100° C. for 5 minutes and a press process. As a result, a negative electrode active material layer was formed on the copper foil. On one of both end surfaces, a negative electrode active material non-coated portion on which the negative electrode active material was not coated was provided, and a negative electrode conductive tab was attached thereon. As a result, a negative electrode was obtained.

(Preparation of Battery for Evaluating Negative Electrode)

85 parts of the positive electrode A, 7 parts of the conductive auxiliary agent A, and 8 parts of polyvinylidene fluoride as the binder were mixed to obtain a mixture, and N-methyl pyrrolidone was further added to and mixed with the mixture to prepare a slurry. This slurry was coated using a doctor blade method on both surfaces of an Al foil having a thickness of 20 μm such that the thickness after roll press was 160 μm, followed by drying at 120° C. for 5 minutes and a press process. As a result, a positive electrode active material layer was formed on the Al foil. On both end surfaces, positive electrode active material non-coated portions on which the positive electrode active material was not coated were provided, and a positive electrode conductive tab was provided on one of the positive electrode active material non-coated portions. As a result, a standard positive electrode for evaluating the negative electrode was obtained.

On the negative electrode, a separator of a polypropylene microporous film having a thickness of 25 μm and a porosity of 55% which was subjected to a hydrophilic treatment was cut and laminated. The positive electrode, the cut separator, and the negative electrode were laminated in this order to form an element.

This element was accommodated in an embossed laminate outer casing, the positive electrode conductive tab and the negative electrode conductive tab were drawn out, and the laminate outer casing was heat-sealed except for a liquid pouring portion. As a result, a battery pack was prepared.

Through the liquid pouring portion, 1.0 mol/L (liter) of an electrolytic solution in which $LiPF_6$ was dissolved in ethylene carbonate (EC)/diethyl carbonate (DEC)=30/70 (volume ratio) was poured into the battery pack, followed by vacuum impregnation. Next, the liquid pouring portion was heat-sealed. As a result, a battery was obtained.

Examples 2 to 5 and Comparative Examples 1 to 4

Batteries were prepared with the same method as that of Example 1, except that the kind and the composition of each component was changed as shown in Table 2, and the pH of the slurry was changed to a value shown in Table 2.

Example 6

A battery was prepared with the same method as that of Example 1, except that the conductive auxiliary agent A, the thickener A, the negative electrode A, and the non-fluorinated polymer A were mixed with each other in a batch process; and the pH of the slurry was changed to a value shown in Table 2.

(Evaluation of Each Electrode)

Each of the obtained electrodes was dipped in an electrolytic solution solvent of propylene carbonate/diethyl carbonate (mass ratio=1:1) at 60° C. for 24 hours, and then the swelling ratio and the elution ratio thereof were calculated according to the following expressions.

Swelling Ratio(%)=(Mass of Wet Electrode after Dipping-Mass of Redried Electrode after Dipping)/ (Mass of Redried Electrode after Dipping)×100  (1)

Elution Ratio(%)=(Mass of Dry Electrode before Dipping-Mass of Redried Electrode after Dipping)/ (Mass of Dry Electrode before Dipping)×100  (2)

The mass of the wet electrode after dipping was measured after the electrode was pulled from the electrolytic solution solvent and the electrolytic solution solvent attached on the electrode surface was wiped off. The measurement was performed five times, and the average value of five values was adopted.

The glass transition temperature of the non-fluorinated polymer in the electrode was measured by differential scanning calorimetry (DSC).

(Evaluation of Battery Characteristics)

Each of the prepared batteries was charged and discharged at 0° C. and 55° C. 500 times. When the discharge capacity of the first measurement was 100%, the discharge capacity of the 500-th measurement was measured to obtain a change ratio. The evaluation results are shown in Table 2.

In addition, when the surface of each of the electrodes was observed with an SEM, a part of the latex particles were observed.

TABLE 1

| Unsaturated Monomer Mixture | | Polymer A | Polymer B | Polymer C |
| --- | --- | --- | --- | --- |
| (a) Carboxyl Group-Containing Unsaturated Monomer | Acrylic Acid | 2 | 2 | 2 |
| (b) Unsaturated Carboxylic Acid Ester Monomer | 2-Ethylhexyl Acrylate | 42 | 42 | 42 |
| | Hydroxyethyl Methacrylate | 1.7 | 1.7 | 1.7 |
| | Butyl Acylate | 16.2 | 8.1 | |
| (c) Unsaturated Monomer Other Than (a) and (b) | Styrene | 38 | 46 | 54 |
| (d) Internal Cross-Linking Agent | Divinylbenzene | 0.1 | 0.2 | 0.3 |
| Particle Size (nm) of Latex Particles | | 210 | 190 | 200 |

TABLE 2

| | | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 |
| --- | --- | --- | --- | --- | --- | --- | --- | --- | --- | --- | --- |
| Non-Fluorinated Polymer | Polymer A | 2 | | | 2 | 2 | 2 | 2 | 2 | | |
| | Polymer B | | 2 | | | | | | | 2 | |
| | Polymer C | | | 2 | | | | | | | 2 |
| Negative Electrode Active Material | Negative Electrode A | 96 | 96 | 96 | | | 96 | 96 | 96 | 96 | 96 |
| | Negative Electrode B | | | | 96 | | | | | | |
| | Negative Electrode C | | | | | 96 | | | | | |
| Thickener | Thickener A | 1 | 1 | 1 | 1 | 1 | 1 | 1 | 1 | 1 | 1 |
| Conductive Auxiliary Agent | Conductive Auxiliary Agent A | 1 | 1 | 1 | 1 | 1 | 1 | 1 | 1 | 1 | 1 |
| Slurry Physical Properties | Slurry pH | 5.1 | 4.9 | 5.4 | 5.2 | 5 | 4.7 | 2.8 | 8 | 8.2 | 7.5 |
| | Particle Size Ratio | 95 | 105 | 100 | 48 | 205 | 95 | 95 | 95 | 105 | 100 |
| Characteristics of Non-Fluorinated Polymer in Electrode | Glass Transition Temperature (° C.) | −5.5 | 0 | 10.2 | −5.5 | −5.5 | −5.5 | −5.5 | −5.5 | 0 | 10.2 |
| | Elution Ratio (%) | 0.6 | 0.5 | 0.3 | 0.8 | 0.7 | 0.9 | 4.2 | 4.1 | 1.2 | 0.5 |
| | Swelling Ratio (%) | 33 | 25 | 15 | 30 | 28 | 34 | 36 | 52 | 14 | 8 |
| Battery Characteristics | Low-Temperature Characteristics (%) (500 Cycle, 0° C.) | 72 | 70 | 68 | 64 | 63 | 62 | 48 | 51 | 44 | 25 |
| | High-Temperature Characteristics (%) (500 Cycle, 55° C.) | 74 | 75 | 78 | 66 | 67 | 64 | 33 | 28 | 45 | 55 |

Priority is claimed on Japanese Patent Application No. 2011-245175 filed on Nov. 9, 2011, the content of which is incorporated herein by reference.

The invention claimed is:

1. A lithium ion secondary battery electrode comprising:
a non-fluorinated polymer;
an active material;
a thickener; and
a conductive auxiliary agent,
wherein an elution ratio of the non-fluorinated polymer in an electrolytic solution solvent at 60° C. is equal to or less than 1.0 mass %, and
a swelling ratio of the non-fluorinated polymer in the electrolytic solution solvent at 60° C. is equal to or more than 10 mass % and equal to or less than 50 mass %.

2. The lithium ion secondary battery electrode according to claim 1,
wherein a glass transition temperature of the non-fluorinated polymer is equal to or higher than −10° C. and equal to or lower than 30° C.

3. The lithium ion secondary battery electrode according to claim 1,
wherein the non-fluorinated polymer contained in the lithium ion secondary battery electrode is formed of latex particles containing the non-fluorinated polymer.

4. The lithium ion secondary battery electrode according to claim 3,
wherein a part of the latex particles is attached on a surface of the lithium ion secondary battery electrode.

5. The lithium ion secondary battery electrode according to claim 3,
wherein a ratio of an average particle size of the active material to an average particle size of the latex particles is equal to or more than 50 and equal to or less than 200.

6. The lithium ion secondary battery electrode according to claim 1,
wherein the non-fluorinated polymer is a polymer obtained by polymerizing an ethylenically unsaturated monomer mixture containing
(a) a carboxyl group-containing unsaturated monomer,
(b) an unsaturated carboxylic acid ester monomer,
(c) an unsaturated monomer other than the (a) and the (b), and
(d) an internal cross-linking agent, and
when a total amount of the ethylenically unsaturated monomer mixture is 100 mass %,
a used amount of the (a) is equal to or more than 0.1 mass % and equal to or less than 10 mass %,
a used amount of the (b) is equal to or more than 20 mass % and equal to or less than 84.8 mass %,
a used amount of the (c) is equal to or more than 15 mass % and equal to or less than 70 mass %, and
a used amount of the (d) is equal to or more than 0.05 mass % and equal to or less than 10 mass %.

7. The lithium ion secondary battery electrode according to claim 1,
wherein when a total amount of an active material layer containing the non-fluorinated polymer, the active material, the thickener, and the conductive auxiliary agent is 100 parts by mass,
a content of the non-fluorinated polymer is equal to or more than 0.5 parts by mass and equal to or less than 3.0 parts by mass,
a content of the active material is equal to or more than 93 parts by mass and equal to or less than 98.9 parts by mass,
a content of the thickener is equal to or more than 0.5 parts by mass and equal to or less than 2.0 parts by mass, and
a content of the conductive auxiliary agent is equal to or more than 0.1 parts by mass and equal to or less than 2.0 parts by mass.

8. A method of manufacturing the lithium ion secondary battery electrode according to claim 1, the method comprising:
a step of mixing the non-fluorinated polymer, the active material, the thickener, and the conductive auxiliary agent with each other to prepare a slurry;
a step of adjusting a pH of the slurry to a range equal to or higher than 3.0 and equal to or lower than 7.0; and
a step of coating the slurry on a current collector and drying the slurry to form the active material layer on the current collector.

9. The method of manufacturing the lithium ion secondary battery electrode according to claim 8,
wherein the pH of the slurry is adjusted with an organic acid.

10. The method of manufacturing the lithium ion secondary battery electrode according to claim 9,
wherein the organic acid is a polyvalent carboxylic acid.

11. The method of manufacturing the lithium ion secondary battery electrode according to claim 8,
wherein after the thickener and the conductive auxiliary agent are mixed with each other to obtain a mixture, the mixture is further mixed with the non-fluorinated polymer and the active material to prepare the slurry.

12. A lithium ion secondary battery which is manufactured using the lithium ion secondary battery electrode according to claim 1.

* * * * *